United States Patent [19]

Mathur et al.

[11] Patent Number: 4,980,395

[45] Date of Patent: Dec. 25, 1990

[54] PROCESS FOR THE PREPARATION OF LARGE SURFACE AREA, FINELY DIVIDED PRECIPITATED CALCIUM CARBONATE AND FILLED POLYMERIC COMPOSITIONS OF MATTER CONTAINING SAID CALCIUM CARBONATE

[75] Inventors: Krishna K. Mathur; Robert K. Resnik; Randall G. Simmons, all of Groton, Conn.

[73] Assignee: Pfizer Inc., New York, N.Y.

[21] Appl. No.: 490,189

[22] Filed: Mar. 8, 1990

Related U.S. Application Data

[60] Division of Ser. No. 204,057, Jun. 7, 1988, Pat. No. 4,927,618, which is a continuation-in-part of Ser. No. 123,037, Nov. 19, 1987, abandoned.

[51] Int. Cl.$^5$ ................................................. C08K 3/26
[52] U.S. Cl. ........................................ 523/200; 524/425
[58] Field of Search ........................... 523/200; 524/425

[56] References Cited

U.S. PATENT DOCUMENTS

| 2,397,035 | 3/1946 | Mowlds | 106/464 |
|---|---|---|---|
| 3,029,153 | 4/1962 | Hackley | 106/308 |
| 3,133,824 | 5/1964 | Podschus | 106/306 |
| 3,394,987 | 7/1968 | Lee et al. | 23/109 |
| 4,018,877 | 4/1977 | Woode | 423/432 |
| 4,133,894 | 1/1979 | Shibazaki et al. | 423/432 |
| 4,157,379 | 6/1979 | Arika et al. | 423/430 |
| 4,367,207 | 1/1983 | Vanderheiden | 423/432 |
| 4,670,499 | 6/1987 | Bonake et al. | 524/427 |

FOREIGN PATENT DOCUMENTS

| 233113 | 3/1961 | Australia | 106/464 |
|---|---|---|---|
| 531395 | 10/1956 | Canada | 423/173 |
| 2741427 | 7/1978 | Fed. Rep. of Germany. | |
| 3339996 | 5/1985 | Fed. Rep. of Germany. | |
| 49-37572 | 10/1974 | Japan. | |
| 51-47597 | 4/1976 | Japan. | |
| 54-035897 | 3/1979 | Japan | 423/430 |
| 54-40830 | 3/1979 | Japan. | |
| 54-133538 | 10/1979 | Japan | 423/430 |
| 57-70131 | 4/1982 | Japan | 106/464 |
| 61-097363 | 5/1986 | Japan | 423/430 |
| 62-31014 | 7/1987 | Japan. | |
| 1030388 | 7/1983 | U.S.S.R. | 423/430 |

OTHER PUBLICATIONS

Mathur, K. et al., Coated Ultrafine Precipitated CaCO$_3$ as Impact Modifier Extender in Low Molecular Weight PVC, Proceedings of the SPE 44th Annual Technical Conference and Exhibit, 1986.
Soviet Inventions Illustrated, Week 84, Jun. 13, 1984, Abstract No. 84-111935 (SU-A-1040387).
Patent Abstracts of Japan, vol. 9, No. 247 (C-307), [1970], Oct. 3, 1985 (JP-A-60103025).
Hakuenka OT & Hakuenka TDD for printing ink, product literature of Shiraishi Calcium Kaisha, Ltd., Div. of Shiraishi Kogyo Kaisha, Ltd., No. 18, 2-Chome, Kitadohshin-Cho, Kita-ku, Osaka, Japan.

*Primary Examiner*—Lewis T. Jacobs
*Attorney, Agent, or Firm*—Peter C. Richardson; J. Trevor Lumb; Gregg C. Benson

[57] ABSTRACT

This invention concerns a process for the preparation of large surface area, finely divided precipitated calcium carbonate which comprises introducing carbon dioxide into an aqueous slurry of greater than about five weight percent calcium hydroxide containing an anionic organopolyphosphonate polyelectrolyte, starting the introduction at a temperature above about 7° C. and below about 18° C., continuing the introduction until calcite precipitation is substantially complete and adding a quantity of polybasic acid to the slurry in an amount greater than about 0.3% by weight of the precipitated calcium carbonate. This invention also concerns said large surface area, finely divided precipitated calcium carbonate which has been coated with a fatty acid derivative and polymeric compositions which contain such coated calcium carbonate.

7 Claims, 2 Drawing Sheets

Notched Izod Impact of Medium Low Molecular Weight Polyvinylchloride Polymer with 5 phr of KM-680 Impact Modifier versus Various Levels of $CaCO_3$
(●─● = 22 m²/g $CaCO_3$; ■──■ = 85 m²/g $CaCO_3$)

Notched Izod Impact of Medium Low Molecular Weight Polyvinylchloride Polymer versus Various Levels of KM-680 Impact Modifier
[with No CaCO$_3$ ●—●, 4 phr CaCO$_3$ (85 m²/g) (▲—▲) or 6 phr CaCO$_3$ (85 m²/g) (△)]

PROCESS FOR THE PREPARATION OF LARGE SURFACE AREA, FINELY DIVIDED PRECIPITATED CALCIUM CARBONATE AND FILLED POLYMERIC COMPOSITIONS OF MATTER CONTAINING SAID CALCIUM CARBONATE

CROSS REFERENCE TO RELATED APPLICATION

This application is a divisional of application Ser. No. 204,057, filed 6-7-88, now Pat. No. 4,927,618, issued 5-22-90, which is a continuation-in-part of application Ser. No. 123,037, filed Nov. 19, 1987, now abandoned.

BACKGROUND OF THE INVENTION

1. Field of the Invention

This invention concerns precipitated calcium carbonate having a large surface area. More specifically, it concerns a novel process for preparing finely divided precipitated calcium carbonate having a large surface area and high purity. Additionally, this invention relates to large surface area, finely divided precipitated calcium carbonate coated with fatty acid derivatives. Further, this invention relates to filled polymeric compositions of matter wherein the filler comprises calcium carbonate of this invention alone or in addition to other fillers known in the art.

2. General Background

A process for precipitating calcium carbonate (calcite) by the carbonation of an aqueous lime slurry in the presence of certain organophosphorous compounds is disclosed in U.S. Pat. No. 4,367,207. The process disclosed in that patent concludes by the treatment of the carbonated slurry with sufficient polybasic acid to essentially neutralize any unreacted calcium hydroxide present. U.S. Pat. No. 4,367,207 teaches the production of calcium carbonate of an average particle size diameter of about 0.01 to 0.03 microns.

A process for producing uniform grain size calcium carbonate by reacting calcium carbonate having an average particle diameter of not more than 20 microns with acidic gas is disclosed in West German Pat. No. 2,741,427. That process, however, requires that the acid gas be dehydrated before use as otherwise the calcium carbonate particles will join together and form lumps or aggregates.

Polyvinylchloride is a transparent polymer which becomes opaque when calcium carbonate having a small specific surface area is added as filler. In order for dispersion of calcium carbonate in polyvinylchloride polymers to occur, the calcium carbonate must be coated with a fatty acid derivative such as a salt of stearic acid. Even coated small specific surface area calcium carbonate imparts a large degree of opacity to polyvinylchloride polymers.

SUMMARY OF THE INVENTION

The present invention concerns a process for the preparation of large surface area, finely divided precipitated calcium carbonate which comprises introducing carbon dioxide into an aqueous slurry of greater than about five weight percent calcium hydroxide containing an anionic organopolyphosphonate polyelectrolyte from about 0.02 to about 1.0 weight percent based on the calcium carbonate equivalent of the hydroxide, preferably in the amount of from about 0.05 to 0.5 weight percent, starting the introduction at a temperature above about 7° C. and below about 18° C., preferably above about 10° C. and below 15° C., continuing the introduction until calcite precipitation is substantially complete and adding a quantity of polybasic acid to the slurry in an amount greater than about 0.3% by weight of the precipitated calcium carbonate, preferably in an amount of from about 1% to about 3% by weight of the precipitated calcium carbonate.

This invention also concerns precipitated calcium carbonate having large surface area produced according to the process described above which has been coated with a fatty acid derivative and the incorporation of such a fatty acid derivative coated precipitated calcium carbonate as a filler in polymeric compositions, preferably polyvinylchloride. Such polyvinylchloride polymer compositions filled with the fatty acid derivative coated precipitated calcium carbonate of this invention have enhanced properties of decreased shear stress, increased impact strength and an increased output level of polymer per unit of energy consumption without significantly sacrificing the transparency of the composition. Preferably, the fatty acid derivative used to coat the calcium carbonate to be used as filler in polyvinylchloride is ammonium or sodium stearate.

DETAILED DESCRIPTION OF THE INVENTION

Figure 1:
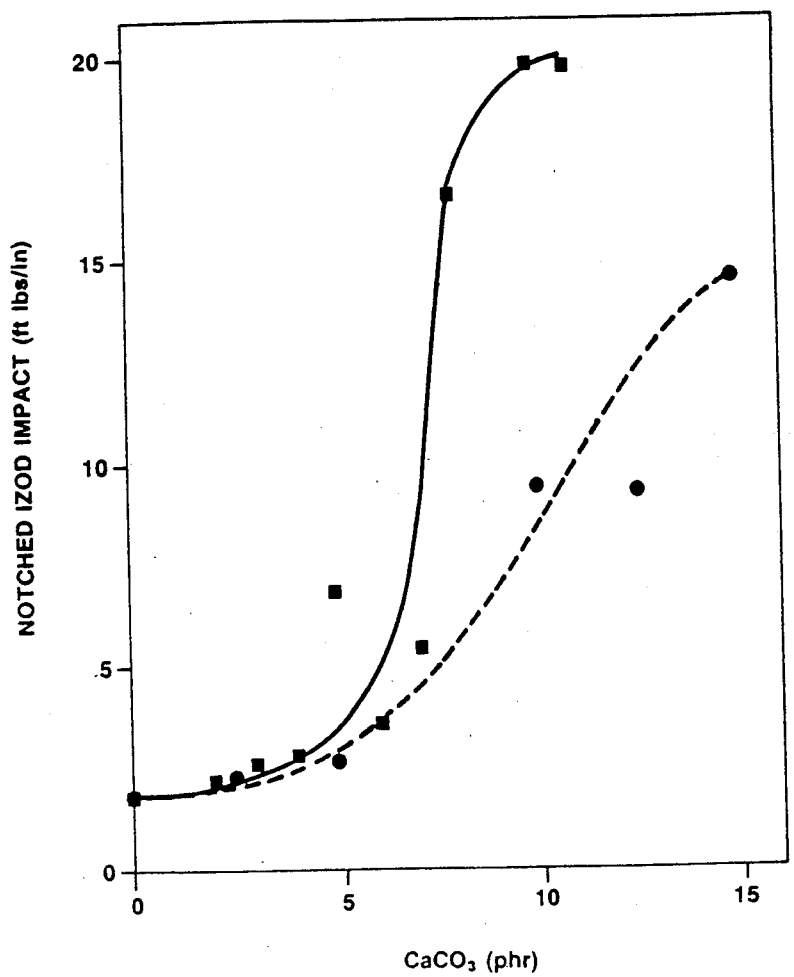
FIG. 1 is a graph of the notched Izod impact strength of medium low molecular weight polyvinylchloride polymers as a function of various levels of two different sodium stearate coated precipitated calcium carbonate preparations. One calcium carbonate preparation had a specific surface area before coating of 22 $m^2/g$ ●—● and the other had a specific surface area before coating of 85 $m^2/g$ ■—■ . All of the compositions contained 5 phr (parts per hundred resin) of KM-680 impact modifier.

The initial part of the process of this invention, namely, the precipitation of calcium carbonate by introducing carbon dioxide into an aqueous slurry containing anionic organopolyphosphonate polyelectrolyte starting at from about 7° C. to below about 18° C., is fully described in U.S. Pat. No. 4,367,207, the teachings of which are incorporated herein by reference. In practicing the process of U.S. Pat. No. 4,367,207 it was found that the amount of polybasic acid required to neutralize the remaining unreacted calcium hydroxide was generally equal to about 0.3% by weight based upon the amount of precipitated calcium carbonate and the resulting precipitated calcium carbonate had a specific surface area less than about 60 $m^2/g$. The instant invention, however, departs from the process of that patent with the addition of polybasic acid in an amount greater than about 0.3% by weight based upon the amount of precipitated calcium carbonate. By adding the additional polybasic acid the resulting finely divided precipitated calcium carbonate has a larger surface area and other useful properties as more fully described hereinbelow.

Suitable polybasic acids for use in the process of this invention include maleic, malic, tartaric, citric, malonic, phthalic, boric, sulfuric, aspartic, sulfurous, oxalic, glutaric and phosphoric acids. Preferably, the polybasic acid used in the process is phosphoric acid.

The anionic organopolyphosphonate polyelectrolyte employed in the process of this invention is in the amount of from about 0.02 to 1.0 weight percent based on the calcium carbonate equivalent of the hydroxide contained in the reaction mixture and, preferably, in an amount of from 0.05 to 0.5 weight percent.

Preferably, the polybasic acid is phosphoric acid in an amount of from about 1.0% to about 3.0% by weight of the precipitated calcium carbonate. Still more preferably, the anionic organopolyphosphonate polyelectrolyte employed in the process of this invention is (2-hydroxyethylimino)bis(methylene)bis phosphonic acid and the temperature at which the introduction of carbon dioxide is started is above about 10° C. and below about 15° C.

The use of an increased level of polybasic acid after precipitation of the calcium carbonate affects the aging/crystal growth phenomenon known to occur in calcium carbonate particles in the wet state. The effect, which is the retardation of the aging process, results in precipitated calcium carbonate having a larger surface area in the resulting dried material.

The precipitated calcium carbonate produced by the novel process of this invention can be further treated with a fatty acid derivative coating, preferably a stearic acid derivative, by methods well known to those skilled in the art. Such coated precipitated calcium carbonate can then be used as a filler or co-filler in a variety of polymeric compositions. Preferably, the precipitated calcium carbonate used for such fillers in polyvinylchloride polymer compositions has an average specific surface area of from about 75 $m^2/g$ to about 85 $m^2/g$ and has been coated with a stearic acid derivative. Precipitated calcium carbonate having a smaller specific surface area results in significantly less transparency in filled polyvinylchloride polymers while a larger specific surface area results in less dispersion of the calcium carbonate in the polyvinylchloride polymer. It has been found that precipitated calcium carbonate having a specific surface area of about 100 $m^2/g$ or greater is not suitable for use as a filler for polyvinylchloride.

The use of stearic acid derivative coated precipitated calcium carbonate produced according to the process of this invention as a filler or co-filler in polyvinylchloride polymer compositions results in the production of novel compositions with increased impact strength at reduced impact modifier levels, increased shear strength and increased output of polymer per unit of energy consumption during manufacture without significantly reducing the transparency of the composition. Preferably, the precipitated calcium carbonate employed in such compositions is coated with a stearic acid derivative containing the equivalent of about 10% by weight of stearic acid compared to the precipitated calcium carbonate and has an average specific surface area before coating of from about 75 $m^2/g$ to about 85 $m^2/g$. Still more preferably, the stearic acid derivative is ammonium stearate or sodium stearate. The stearic acid derivative coated precipitated calcium carbonate can be employed as a filler in such compositions at levels up to about 10 phr (parts per hundred resin). Preferably, such calcium carbonate filler is used at levels from about 4 to about 6 phr. Such compositions can also contain stabilizers, process aids, lubricants and toner as well as impact modifier, all of which are well known to those skilled in the art. However, the level of impact modifier employed to achieve satisfactory impact strength in such compositions is reduced by the addition of the coated precipitated calcium carbonate and the resulting polymer does not suffer from any significant reduction in transparency. The compounding and blending of such compositions will be readily apparent to those skilled in the art enabled by the disclosure of this invention.

The filled polyvinylchloride polymers of this invention are suitable for use in the manufacture of bottles, light panels, greenhouse panels, privacy fences and the like.

Other filled polymeric compositions can be made employing the large surface area, finely divided precipitated calcium carbonate produced by the process of this invention by those skilled in the art, enabled by the teachings of this invention. For example, polymers of similar refractive index to polyvinylchloride such as low density polyethylenes can be so filled. It is to be noted, however, that polystyrene filled with the finely divided precipitated calcium carbonate of this invention suffers a loss to its physical properties although its clarity is less affected.

Still other uses for the precipitated calcium carbonate produced according to the process of this invention exist and will be apparent to those skilled in the art enabled by this disclosure.

The following Examples serve to illustrate the present invention and are not to be construed to limit the invention in any way to the specific embodiments contained therein.

EXAMPLE 1

The following calcium carbonate precipitation was conducted in a 30 liter stainless steel reactor equipped with a cooling jacket, an agitator having two pitched-blade turbine impellers, a stainless steel carbonation tube to direct a carbon dioxide gas stream to the impeller and a probe for monitoring the pH of the suspension.

A calcium hydroxide slurry was prepared by rapidly adding 1,550 g of pulverized reactive lime having an approximately 93% available calcium oxide content to 7.75 liters of water at 50° C. contained in the 30 liter reactor agitated at 400 rpm. After 10 minutes the slake lime slurry was cooled from its final temperature of 82° C. to 13° C.

An amount of active (2-hydroxyethylimino) bis(methylene)bis phosphonic acid (Wayplex® 61-A, Philip A. Hunt Chemical Corp.) equivalent to 0.05% by weight of the calcium carbonate equivalent of the calcium hydroxide slurry was added to the slaked lime slurry. The slurry was diluted with 15.50 liters of water to give a final calcium hydroxide concentration of 7.68%. The slaked lime slurry was adjusted to 13° C., the agitation rate set at 800 rpm, and the slurry was carbonated by passing a 28 volume percent carbon dioxide in air mixture at 85 liters/minute through the slurry. The batch was carbonated over a 31 minute period to a pH of 8.0. The batch was cooled throughout the carbonation during which time the temperature increased to 19° C. The carbonated slurry was then treated with 60.5 g of 85% phosphoric acid diluted 1:1 with water, representing 2.0% phosphoric acid based on the calcium carbonate content of the slurry. The slurry pH dropped to 6.9 after the phosphoric acid addition. The slurry was then passed through a 325 mesh screen to remove the grit present in the lime and dewatered on a vacuum filter. The filter cake was dried overnight at 110° C. to yield precipitated calcium carbonate having a specific surface area of 85 m²/g. The surface area was determined by outgassing a sample of the precipitated calcium carbonate of known weight in nitrogen at 275° C. for 45 minutes, then measuring the surface area by the single point BET nitrogen adsorption method using Micromeritics Model 2200 Surface Area Analyzer (Micromeritics, Norcross, Ga.) according to the procedure described in Micromeritics Instruction Manual (Catalog No. 220/00000/0X), dated Oct. 8, 1979. The specific surface area was then calculated by dividing the surface area so determined by the weight of the sample and is expressed as m²/g.

EXAMPLE 2

Precipitated calcium carbonate was prepared using the same equipment and slaking and carbonation procedures of Example 1 with the following differences. The starting carbonation temperature was 15° C. and rose to 18° C. after carbonating for 31 minutes to a pH of 8.0. The product slurry was then treated with 36.3 g of 85% phosphoric acid representing 1.2% phosphoric acid based on the calcium carbonate content of the slurry. The final dried product from this Example had a specific surface area of 74 m²/g.

EXAMPLE 3

Precipitated calcium carbonate was prepared following the slaking and carbonation procedures of Example 2 with the following exceptions. The calcium hydroxide concentration was 11.2%, the Wayplex ® 61-A amount was 0.25% on a calcium carbonate basis and the starting carbonation temperature was 14° C., rising to 15° C. at the end of carbonation. The carbonated slurry was treated with 30.2 g of 85% phosphoric acid or 1.0% phosphoric acid based on the calcium carbonate content of the slurry. The final dried product had a specific surface area of 82 m²/g.

EXAMPLE 4

Precipitated calcium carbonate was prepared according to the procedures of Example 1 with the following variations. The calcium hydroxide concentration at the beginning of carbonation was 9.45%, the temperature was 12° C. rising to 18° C. at the end of carbonation. An amount of phosphoric acid corresponding to 1.2% on a calcium carbonate basis was added to the carbonated slurry. The final dried calcium carbonate product had a specific surface area of 77 m²/g.

EXAMPLE 5

Precipitated calcium carbonate was prepared according to the procedures of Example 1 with the following differences. The calcium hydroxide concentration was 11.2% and 1.6% phosphoric acid on a calcium carbonate basis was added to the final carbonated slurry. The final dried calcium carbonate had a specific surface area of 85 m²/g.

EXAMPLE 6

Using the equipment and procedures of Example 1, a series of precipitated calcium carbonate preparations were prepared using various levels of phosphoric acid and with the following variations. The Wayplex ® 61-A amount was 0.25% on a calcium carbonate basis and the starting carbonation temperature was 14° C. The carbonated slurry was reacted with phosphoric acid at various levels. The surface area of the precipitated calcium carbonate so produced was measured as described in Example 1. The results, which demonstrate the effect of various levels of phosphoric acid on the specific surface area of precipitated calcium carbonate so produced, are contained in Table I below. As Table I shows, the specific surface area of the precipitated calcium carbonate increases as the amount of phosphoric acid increases.

TABLE I

Effect of Various Phosphoric Acid Levels on Specific Surface Area of Precipitated Calcium Carbonate

| Example No. | $H_3PO_4$ (wt. %)* | Specific Surface Area (m₂/g) |
|---|---|---|
| 6A | 0.0 | 47.5 |
| 6B | 0.75 | 71.9 |
| 6C | 1.0 | 80.6 |
| 6D | 1.5 | 89.8 |
| 6E | 2.0 | 92.3 |
| 6F | 3.0 | 96.9 |
| 6G | 4.0 | 101.4 |

*wt. % is based on the calcium carbonate content of the slurry.

EXAMPLE 7

Precipitated calcium carbonate slurry prepared according to the procedure of Example 5 up to and including the 325 mesh screening step was reacted with a surface treating agent in the following manner.

Stearic acid was liquified by adding 244 g of commercial triple-pressed stearic acid to 1950 ml of water heated to 75°–80° C. under mild agitation. To the stearic acid emulsion was added 151 g of a 25% sodium hydroxide solution to prepare a sodium stearate solution. Fifteen liters of slurry containing 2200 g of calcium carbonate was agitated and heated to 80° C. in a 30 liter vessel. The sodium stearate solution was then slowly added over about 5 minutes to the well-agitated calcium carbonate suspension. The suspension was maintained at 80°–85° C. for one hour. The hot, coated calcium carbonate slurry was filtered, dried at 110° C. and pulverized to yield a fine powder. Analysis of the product showed it to contain 10% by weight stearic acid equivalent.

EXAMPLE 8

Surface coated precipitated calcium carbonate was prepared according to the procedure of Example 7 except for a modification in the preparation of the stearate coating emulsion. In this case the stearic acid emulsion was neutralized with an excess of ammonium hydroxide rather than sodium hydroxide.

Thus, an ammonium stearate emulsion was prepared by adding 47 g of 29% ammonium hydroxide solution to 159 g of triple-pressed stearic acid contained in 1.5 liters of water at 80° C. under mild agitation. The ammonium stearate emulsion was then added over about a five minute period to 12 liters of an agitated aqueous suspension containing 1427 g of calcium carbonate at 80° C. in a 30 liter vessel. The suspension was held at 80°–85° C. under agitation for one hour. The hot, coated calcium carbonate slurry was filtered, dried at 110° C. and pulverized to yield a powder containing 10% by weight stearic acid equivalent.

EXAMPLE 9

Polyvinylchloride formulations were prepared using a medium low molecular weight polyvinylchloride and a basic formulation suitable for bottle applications with 5 phr of impact modifier and various levels of 10% sodium stearate coated precipitated calcium carbonate having a specific surface area before coating of either 22 m$^2$/g or 85 m$^2$/g. The basic formulation used was as follows:

|  | Parts |
|---|---|
| PVC Resin (K52-55)[a] | 100 |
| Tin Stabilizer (octyl) [M&T 813][b] | 0.5 |
| Tin Stabilizer (octyl) [M&T 831][b] | 1.5 |
| Impact Modifier KM-680[c] | 5.0 |
| Process Aid (Acrylic) [M&T P550][b] | 1.2 |
| Process Aid (Acrylic) [M&T P700][b] | 1.2 |
| Lubricant (External) [HOB 7107][d] | 0.7 |
| Lubricant (Internal) [HOB 7111][d] | 0.4 |
| Toner (Blue)[e] | 0.005 |
| Calcium Carbonate (Sodium Stearate Coated) | various |

[a]Georgia Gulf Corporation, Plaquemine, Louisiana
[b]M&T Chemicals, Inc.
[c]Rohm & Haas, Philadelphia, Pennsylvania
[d]Henkel Chemical
[e]H. Kohnstamm The above formulations, which contained various levels of sodium stearate coated calcium carbonate of different specific surface area, were compounded using a Farrell Model BR Banbury mixer (Farrell, Inc., Ansonia, Conn.). The dry blends (1.8 kg each) were mixed at a motor speed of 230 rpm and a ram air pressure of 20 psi (1.4 kg/cm$^2$) until complete fusion was obtained (about 330° F. (165.6° C.)). The fused plastic was sheared for an additional thirty (30) seconds at a motor speed of 116 rpm and then discharged onto a hot two roll mill (300° F. (148.9° C.)) to form a ¼" (6.35 mm) thick sheet. The sheet was cut into pieces about six inches (15.2 cm) square and granulated when cool. The granules were injection molded into standard ASTM test pieces in an Arburg Allrounder Model 320-210-750 injection molding machine (Polymer Machinery, Inc., Berlin, Conn.) outfitted with a 30 mm diameter screw having a length to diameter ratio of 23.5:1, a compression ratio of 1.8:1 and having a smear tip. The injection unit temperature settings from feed section to nozzle were 300° F. (148.9° C.), 330° F. (165.6° C.), 350° F. (176.7° C.) and 380° F. (193.3° C.). The mold temperature was 90° F., the screw speed was 85 rpm and the back pressure was less than 100 psi (7 kg/cm$^2$). Injection pressure was adjusted to yield a cavity pressure of 5000 psi (351.5 kg/cm$^2$).

Ten molded flex bars for each formulation were conditioned for at least 48 hours at 65% relative humidity and 72° F. (22.2° C.), cut and notched according to ASTM procedure D-256, Method A. Using the ASTM D-256 test procedure, the notched Izod was determined for the formulations described above. The results are shown in FIG. 1.

The precipitated calcium carbonate of this invention when coated with sodium stearate and used in formulations of polyvinylchloride enhanced the notched Izod impact properties of the polymer to a greater extent and at a lower level than did the sodium stearate coated precipitated calcium carbonate having a specific surface area of 22 m$^2$/g.

EXAMPLE 10

Various formulations of medium low molecular weight polyvinylchloride were prepared according to the procedure of Example 9 except that the formulations did not contain impact modifier and the formulations contained 5 phr of a specific coated precipitated calcium carbonate. The process of blending was the same and the blends, after fusion and shearing were discharged onto a hot two roll mill (300° F. (148.9° C.)) to form a 30±2 mil thick sheet. One formulation contained sodium stearate coated precipitated calcium carbonate (22 m$^2$/g before coating) produced according to U.S. Pat. No. 4,367,207. Another formulation contained sodium stearate coated precipitated calcium carbonate (85 m$^2$/g before coating) produced according to this invention. A third formulation contained ammonium stearate coated precipitated calcium carbonate (85 m$^2$/g before coating) produced according to this invention. All of the coated precipitated calcium carbonates contained about 10% by weight of stearic acid equivalent.

Samples from the sheets so produced were assayed for opacity according to the procedures described in ASTM-D2805-85 and the results are shown below in Table II.

TABLE II

Opacity of Unfilled and Filled Medium Low Molecular Weight Polyvinylchloride Polymer Sheets

| Filler | Opacity |
|---|---|
| None | 10.3% |
| Sodium Stearate coated PCC* (22 m$^2$/g) | 28.3% |
| Sodium Stearate coated PCC of this invention (85 m$^2$/g) | 19.9% |
| Ammonium Stearate coated PCC of this invention (85 m$^2$/g) | 15.8% |

*PCC = precipitated calcium carbonate.

EXAMPLE 11

Using the procedure described in Example 9, various polyvinylchloride formulations were prepared with the following variations:

| No. | KM-680 Modifier phr | CaCO$_3$ (85 m$^2$/g before coating) (10% sodium stearate coated) phr |
|---|---|---|
| 11A | 8 | 0 |
| 11B | 9 | 0 |
| 11C | 10 | 0 |
| 11D | 12 | 0 |
| 11E | 8 | 4 |
| 11E | 9 | 4 |
| 11G | 10 | 4 |
| 11H | 8 | 6 |

Figure 2:
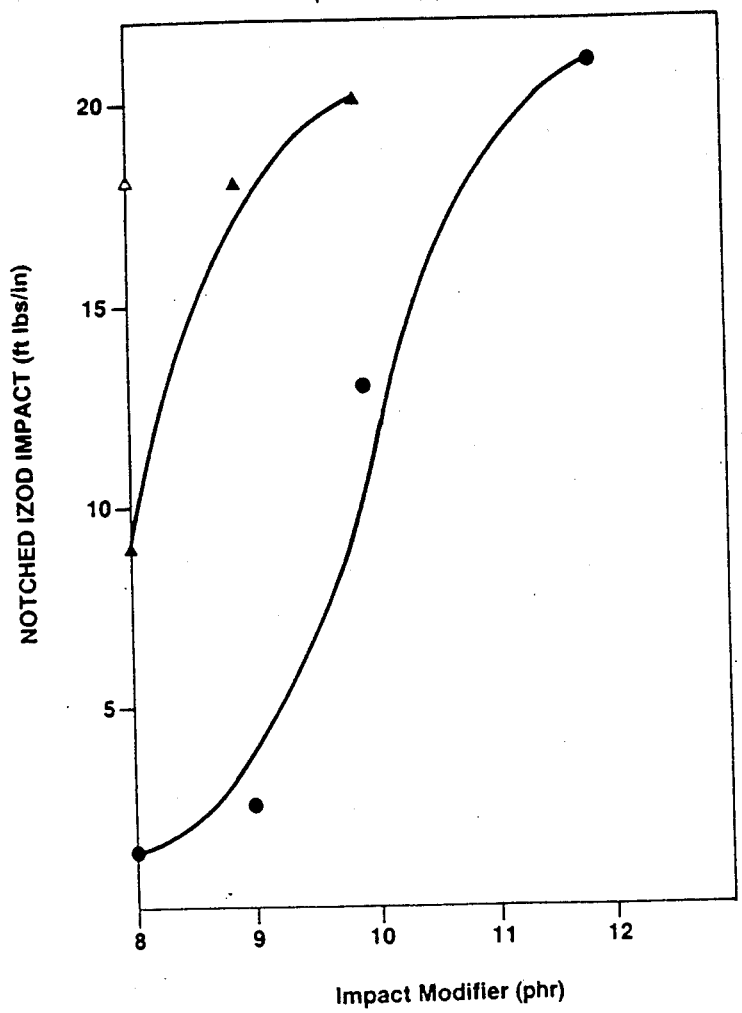
FIG. 2 is a graph of the notched Izod impact strength of medium low molecular weight polyvinylchloride polymers as a function of various levels of KM-680 impact modifier in the presence of (i) no calcium carbonate ●—● , (ii) 4 phr calcium carbonate (85 $m^2/g$, sodium stearate coated) ▲—▲ or (iii) 6 phr calcium carbonate (85 $m^2/g$, sodium stearate coated) △.

The formulations were blended, molded and tested for notched Izod impact strength as described in Example 9. The resulting notched Izod impact values for the various polymers are shown in FIG. 2. The addition of 85 m$^2$/g CaCO$_3$ coated with 10% sodium stearate significantly increased the notched Izod impact strength of the polymers at reduced levels of impact modifier.

EXAMPLE 12

The effect of varying levels of impact modifier and calcium carbonate filler on polyvinylchloride polymer output was examined according to the following method. Various compositions of polyvinylchloride were prepared according to the process of Example 9 except that the level of KM-680 impact modifier and calcium carbonate were varied. The precipitated calcium carbonate employed had an average specific surface area of 85 m$^2$/g and was coated with sodium stearate. The polymer compositions were blended as described in Example 9 and then extruded from a Leistritz Extruder at 16–17 Amps under a die pressure of 800–900 psi (56.2–63.3 kg/cm$^2$). The output from the extruder was measured in pounds per hour (kg per hour) and the results are shown below in Table III.

TABLE III

Effect of Various Impact Modifier and CaCO$_3$ (85 m$^2$/g) Levels on Extruder Output of Filled Polyvinylchloride Polymer

| CaCO$_3$ (phr) | KM-680 Impact Modifier (phr) | Output (lbs/hr) | [kg/hr] |
|---|---|---|---|
| 0 | 10 | 21 | [9.53] |
| 4 | 10 | 27 | [12.25] |
| 4 | 9 | 27 | [12.25] |
| 6 | 8 | 26 | [11.79] |
| 6 | 7 | 26 | [11.79] |

The use of 4 phr of coated precipitated calcium carbonate with either 10 or 9 phr of impact modifier resulted in an output increase of more than 25%. This, coupled with a reduction in the amount of impact modifier which is possible without sacrificing impact strength (see Example 11), results in a composition which has transparency and impact strength and which can be produced much more economically.

COMPARATIVE EXAMPLE

Polyvinylchloride formulations were prepared as described in Example 9 with the following variations. The impact modifier was used at a level of 9 phr. Two different preparations of sodium stearate coated precipitated calcium carbonate were employed at levels of 2 phr and 4 phr. One preparation was precipitated calcium carbonate produced according to U.S. Pat. No. 4,367,207 and had a specific surface area before coating of 42 m$^2$/g. The other preparation was precipitated calcium carbonate produced according to this invention having a specific surface area before coating of 85 m$^2$/g. Following the blending, molding and testing procedures of Example 9, the notched Izod values for the respective compositions were determined and are shown in Table IV below.

TABLE IV

Notched Izod Values of Polyvinylchloride Polymers Containing 9 phr Impact Modifier and 42 m$^2$/g or 85 m$^2$/g Precipitated Calcium Carbonate Coated with Sodium Stearate

| Specific Surface Area (m$^2$/g) | phr | notched Izod (ft.lb/in) |
|---|---|---|
| 42 | 2 | 2.7 |
| 4 | 9.0 | |
| 85 | 2 | 3.1 |
| 4 | 16.8 | |

The data in Table IV show that the use of precipitated calcium carbonate having a specific surface area of 85 m$^2$/g, produced according to the process of this invention and coated with sodium stearate as a filler increased the impact strength of polyvinylchloride polymers above that obtained with sodium stearate coated calcium carbonate having a specific surface area of 42 m$^2$/g produced according to the process of U.S. Pat. No. 4,367,207 at both levels tested.

What is claimed is:

1. A filled polymeric composition wherein said filler comprises precipitated calcium carbonate having a coating thereon derived from a salt of a fatty acid, prepared according to a process which comprises introducing carbon dioxide into an aqueous slurry of calcium hydroxide containing anionic organopolyphosphonate polyelectrolyte present in the amount of from about 0.02 to about 1.0 weight percent based on the calcium carbonate equivalent of said hydroxide, the concentration of said hydroxide in said slurry being greater than about 5 weight percent, starting said introduction at a temperature above about 7° C. and below about 18° C., continuing said introduction until calcium carbonate precipitation is substantially complete, adding a polybasic acid selected from the group consisting of maleic, malic, tartaric, citric, malonic, phthalic, boric, sulfuric, aspartic, sulfurous, oxalic, glutaric and phosphoric acids in an amount from about 0.75 to about 4.0 weight percent based on the precipitated calcium carbonate and reacting the precipitated calcium carbonate with a salt of a fatty acid, with the proviso that when the polymer is polyvinylchloride, the specific surface area of the calcium carbonate is not greater than about 100 m$^2$/g.

2. The filled polymeric composition according to claim 1 wherein the polymeric is polyvinylchloride.

3. The filled polymeric composition according to claim 2 wherein the calcium carbonate has an average specific surface area of from about 75 m$^2$/g to about 85 m$^2$/g.

4. The filled polymeric composition according to claim 3 wherein the calcium carbonate is present at from about 4 phr to about 6 phr.

5. The filled polymeric composition according to claim 4 wherein the salt of a fatty acid is sodium stearate or ammonium stearate.

6. A filled polyvinylchloride polymer composition which comprises polyvinylchloride; about 9 phr of impact modifier; and about 4 phr of precipitated calcium carbonate having an average specific surface area of from about 75 m$^2$/g to about 85 m$^2$/g and having a coating thereon derived from a salt of a fatty acid.

7. The filled polyvinylchloride polymer composition according to claim 6 wherein the salt of a fatty acid is ammonium stearate or sodium stearate.

* * * * *

UNITED STATES PATENT AND TRADEMARK OFFICE
CERTIFICATE OF CORRECTION

PATENT NO. : 4,980,395
DATED : December 25, 1990
INVENTOR(S) : Krishna K. Mathur et al.

It is certified that error appears in the above-identified patent and that said Letters Patent is hereby corrected as shown below:

At the title page, under Other Publications, "(SU-A-1040387)" should read --(SU-A-1030387)--;

At Column 8, line 58, "11E" should read --11F--; and

At Column 10, lines 6-12, the Table should read

| Specific Surface Area ($m^2/g$) | phr | notched Izod (ft. lb./in.) |
|---|---|---|
| 42 | 2 | 2.7 |
|  | 4 | 9.0 |
| 85 | 2 | 3.1 |
|  | 4 | 16.8 |

Signed and Sealed this

First Day of December, 1992

Attest:

DOUGLAS B. COMER

Attesting Officer        Acting Commissioner of Patents and Trademarks